United States Patent

[11] 3,562,626

| [72] | Inventor | Hans-Jurgen Morell<br>Munich, Germany |
|---|---|---|
| [21] | Appl. No. | 821,246 |
| [22] | Filed | May 2, 1969 |
| [45] | Patented | Feb. 9, 1971 |
| [73] | Assignee | Siemens Aktiengesellschaft<br>Munich, Germany<br>a corporation of Germany |
| [32] | Priority | May 9, 1968 |
| [33] | | Germany |
| [31] | | P 17 57 439.9 |

[54] CIRCUIT ARRANGEMENT FOR AUTOMATICALLY CONTROLLING THE VOLTAGE OF AN ELECTRICAL FILTER
3 Claims, 3 Drawing Figs.

[52] U.S. Cl............................................................ 321/18,
323/24
[51] Int. Cl......................................................... H02m 7/20
[50] Field of Search............................................ 321/9, 10,
18; 323/22T, 24; 333/79

[56] References Cited
UNITED STATES PATENTS
3,037,159  5/1962  Brown.......................... 321/9X

| 3,289,069 | 11/1966 | Todd............................ | 321/18 |
| 3,303,405 | 2/1967 | Schwarz....................... | 321/10X |
| 3,348,122 | 10/1967 | Todd............................ | 321/18 |
| 3,354,380 | 11/1967 | Fly et al........................ | 321/18 |
| 3,356,927 | 12/1967 | Barron......................... | 321/18 |
| 3,375,428 | 3/1968 | Mitchell....................... | 321/18 |
| 3,400,319 | 9/1968 | Stich............................. | 321/18X |
| 3,418,557 | 12/1968 | Schaefer...................... | 321/18 |

*Primary Examiner*—William M. Shoop, Jr.
*Attorneys*—Curt M. Avery, Arthur E. Wilfond, Herbert L. Lerner and Daniel J. Tick ABSTRACT: A filter is coupled to an AC voltage source via a control member which is controlled in operation by a control circuit. A switching component coupled to the control capacitor is connected to the control member via a counter which controls the conductivity condition of the switching component in a manner whereby the control capacitor is discharged only when the instantaneous magnitude of current flowing through the control member exceeds a response level within a specific interval between successive half waves of the AC source.

CIRCUIT ARRANGEMENT FOR AUTOMATICALLY CONTROLLING THE VOLTAGE OF AN ELECTRICAL FILTER

The present invention relates to an electrical filter. More particularly, the invention relates to a circuit arrangement for automatically controlling the voltage of an electrical filter.

The electrical filter is coupled to an AC voltage source via a control member, a transformer and a rectifier. The control member, transformer and rectifier are connected in series between the AC voltage source and the filter. A control circuit connected to the control member controls the operation of the control member and comprises a control unit. The control unit has an input connected to the AC voltage source and an output connected to the control member and supplies to said control member a control magnitude corresponding to a control voltage applied to another input of the control unit. A control capacitor is connected to a DC voltage source via a charging resistor and is connected to the other input of the control unit for applying a control voltage to said control unit. The control voltage depends upon the voltage of the control capacitor. A switching component is connected in parallel with the control capacitor and said control capacitor is coupled to a discharge circuit via the switching component. The control circuit controls the conductivity condition of the switching component in a manner whereby the control capacitor is discharged in accordance with the instantaneous magnitude of current flowing through the control member. The discharge of the control capacitor is very considerable.

The control l member may comprise a control transformer, a transducer, a thyristor control circuit of the rectifier itself, if said rectifier is a controlled rectifier. The AC energizing voltage may be provided by a single phase or multiphase source. In circuit arrangements of this type, an arc ignited at the end of the half wave is frequently extinguished without outside interference and does not reignite during the following half wave. In this instance, the effected considerable reduction constitutes an unnecessary reduction of the median level of the voltage of the electrical filter. This in turn results in impairment of the effectiveness of the filter.

I have recognized the fact that a considerable reduction occurs only if the arc does not become extinguished, in any case, at the end of the half wave.

The principal object of the present invention is to provide a new and improved circuit arrangement for automatically controlling the voltage of an electrical filter.

An object of the present invention is to provide a circuit arrangement for automatically controlling the voltage of an electrical filter in a manner which overcomes the disadvantages of known circuit arrangements of similar type.

An object of the present invention is to provide a circuit arrangement for automatically controlling the voltage of an electrical filter to prevent reduction of the median level of the filter voltage.

An object of the present invention is to provide a circuit arrangement for automatically controlling the voltage of an electrical filter with efficiency, effectiveness and reliability.

In accordance with the present invention, the conductivity condition of the switching component is controlled via a counter in a manner whereby the control capacitor is discharged only when the instantaneous magnitude of current flowing through the control member exceeds a response level within a specific interval between successive half waves of the AC source.

The counter preferably comprises a monostable flip-flop connected to an AND gate and a timing circuit. The flip-flop of the counter includes a transistor having an emitter-collector path which may be connected via the AND gate to another control capacitor.

In order that the present invention may be readily carried into effect, it will now be described with reference to the accompanying drawings, wherein.

In the FIGS., the same components are identified by the same reference numerals.

Figure 1:
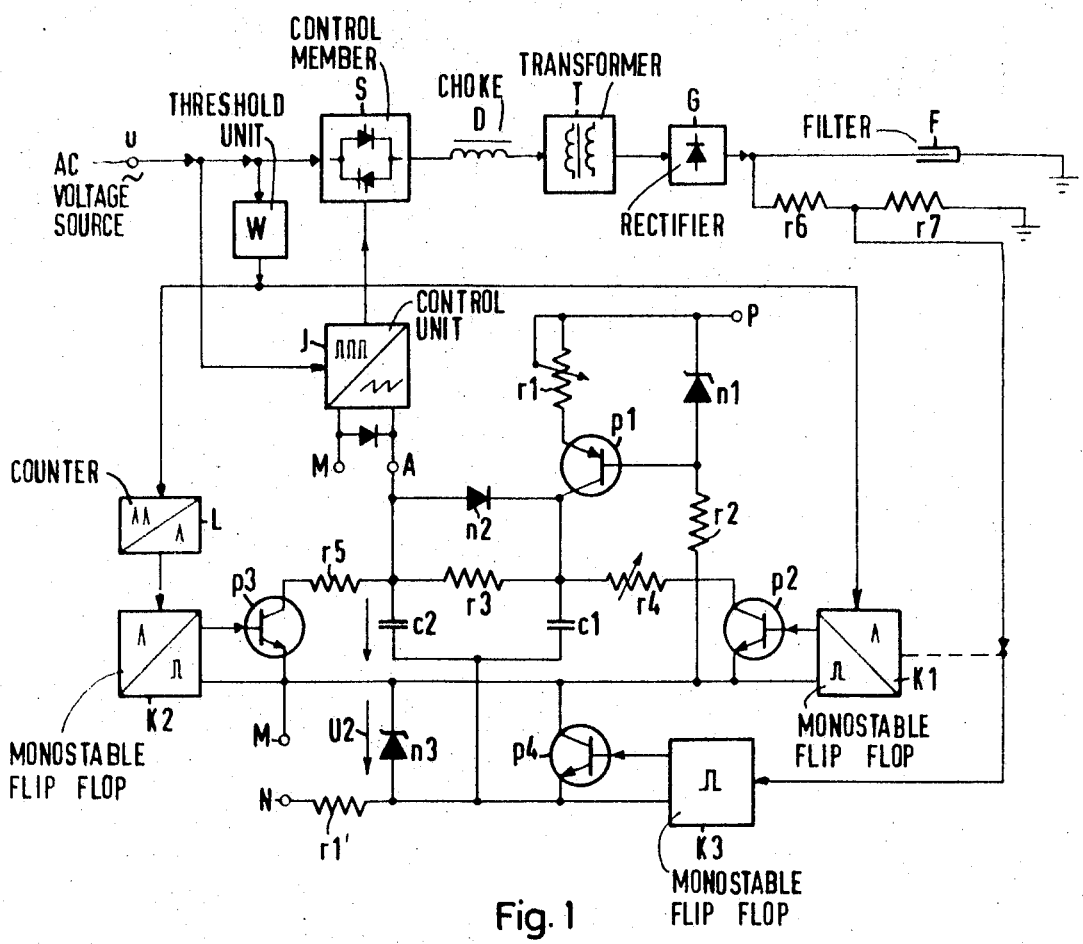
FIG. 1 is a combined block and circuit diagram of an embodiment of the circuit arrangement of the present invention for automatically controlling the voltage of an electrical filter.

In FIG. 1, the power circuit is indicated symbolically. It comprises an electrical filter F connected to the secondary winding of a high voltage transformer T via a rectifier G. The primary winding of the high voltage transformer T is connected to a terminal $u$ of a single phase AC voltage source via a smoothing choke D and a control member S. The choke D functions to improve the voltage form and the control member S comprises thyristors connected to each other in antiparallel relation, with the anode of one connected to the cathode of the other and with the cathode of one connected to the anode of the other.

The control pulses for controlling the thyristors of the control member S are provided by a control unit J. The AC voltage source provides AC voltage for energizing and synchronizing the control unit J. A control voltage UAM is applied between input terminals A and M of the control unit. The control voltage UAM is provided by the control circuit of the present invention.

A control capacitor $c2$ is connected in series with a Zener diode $n3$ between the input terminals M and A. The Zener diode $n3$ is connected in series with a resistor $r1'$ between the terminals M and N of a DC voltage source in a manner whereby there is a voltage drop U2 across said Zener diode in the direction of the arrow adjacent to said Zener diode in FIG. 1. A transistor $p4$ has emitter, collector and base electrodes and an emitter-collector path in parallel with the Zener diode $n3$.

The control path or base electrode of the transistor $p4$ is connected to a monostable flip-flop K3 in a manner whereby the conductivity condition of said transistor is effected by said flip-flop only during the flyback or return time of said flip-flop for a duration of a half period of the alternating voltage of the AC voltage source $u$. The input of the flip-flop K3 is connected to the tap point of a voltage divider comprising resistors $r6$ and $r7$. The voltage divider $r6$, $r7$ is connected in parallel with the filter F. The flip-flop K3 is thus switched to its unstable state or condition only when the filter voltage exceeds the adjusted threshold level. The control capacitor $c2$ is connected in parallel with another control capacitor $c1$ via a resistor $r3$. The second control capacitor $c1$ has a considerably greater capacitance than the first control capacitor $c2$. The second control capacitor $c1$ is connected in parallel with the emitter-collector path of a transistor $p2$ via a variable resistor $r4$. The transistor $p2$ has emitter, collector and base electrodes and an emitter-collector path. The control path or base electrode of the transistor $p2$ is connected to the output of a monostable flip-flop K1.

A threshold unit W is connected between the AC voltage source $u$ and the input to the flip-flop K1. The threshold unit W comprises a current converter, a rectifier and a threshold member. The threshold unit W energizes the flip-flop K1 when the current flowing through the control member S exceeds a response level determined by the threshold member of said threshold unit. The flyback or return time of the flip-flop K1 is relatively short and permits only a desired discharge of the control capacitors $c2$ and $c1$.

A diode $n2$ is connected in parallel with the resistor $r3$. The polarity of the diode $n2$ is such that both control capacitors $c2$ and $c1$ are simultaneously discharged when the transistor $p2$ is in its conductive condition.

A transistor $p1$ has emitter, collector and base electrodes, and an emitter-collector path. The control capacitor $c1$ is connected, via the emitter-collector path of the transistor $p1$ and a variable resistor $r1$, across the terminals P and M of another DC voltage source. A voltage divider, which comprises a resistor $r2$ and a Zener diode $n1$, is connected across the terminals P and M of the second DC voltage source. The Zener diode $n1$ is connected in parallel with the series connection of the control path or base electrode of the transistor $p1$ and the variable resistor $r1$.

The transistor $p1$ supplies a constant charging current to the control capacitors $c2$ and $c1$. The charging current provided by the transistor $p1$ is independent of the charged condition of the control capacitors $c2$ and $c1$ and is determined only by variation of the variable resistor $r1$. The charging current may thus be adjusted via a relatively low resistance potentiometer, within a very wide range such as, for example, 1:200, without the necessity for a high energizing voltage.

A transistor $p3$ has emitter, collector and base electrodes, and an emitter-collector path. The control capacitor $c2$ is connected in parallel with the emitter-collector path of the transistor $p3$ via a resistor $r5$. The control path or base electrode of the transistor $p3$ is connected to the output of a monostable flip-flop $K2$. The flip-flop $K2$ has an input connected to the output of the threshold unit W via a counter L. The counter L provides a pulse at its output only if, during a specific interval of time such as, for example, during two successive half waves of the AC energizing voltage, the threshold unit W provides a signal.

The transistors $p2$, $p3$ and $p4$ may each comprise a component of the corresponding one of the flip-flops $K1$, $K2$ and $K3$. The transistors $p2$, $p3$ and $p4$, together with the transistor $p1$, comprise a monostable feedback system.

Figures 2, 3:
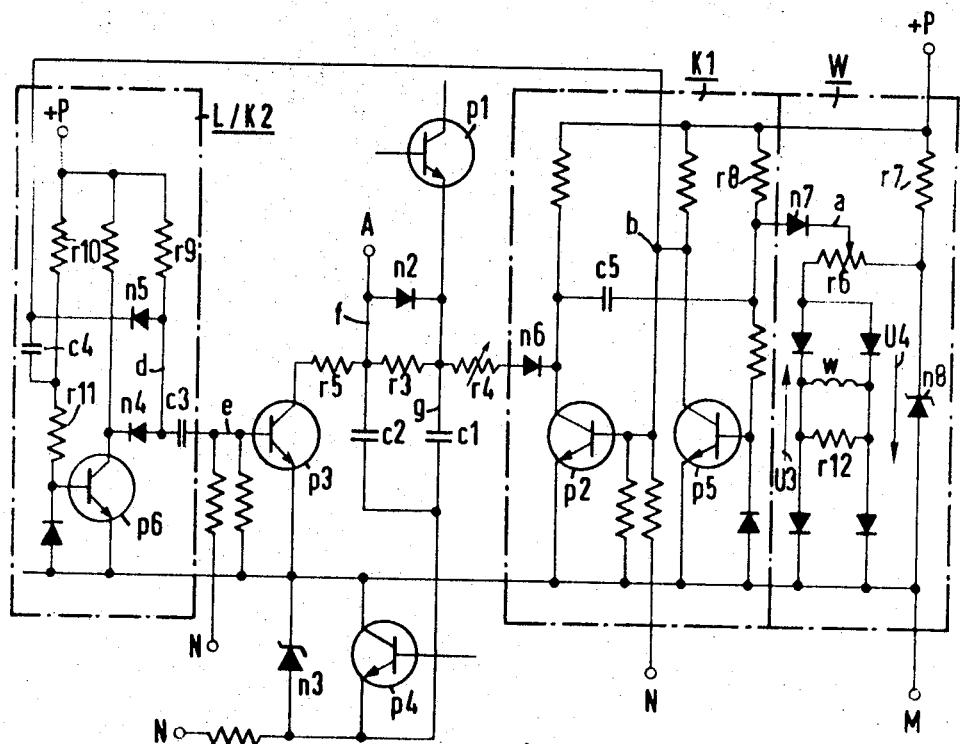
FIG. 2 is a circuit diagram of most of the embodiment of FIG. 1.
FIG. 3 is a graphical presentation of the voltage waveforms appearing at different points of the circuit arrangement of FIG. 2.

FIG. 2 discloses the circuitry of the counter L, the threshold unit W and each of the flip-flops $K1$ and $K2$. Only those portions of the circuit arrangement of FIG. 1 which are necessary for an understanding of the operation of the counter L, the threshold unit W and the flip-flops $K1$ and $K2$ are included in the circuit arrangement of FIG. 2. In FIG. 2, the flip-flop $K1$ comprises the transistor $p2$ and a transistor $p5$. The transistors $p2$ and $p5$ are provided with known feedback circuits. One of the feedback circuits of the transistors $p2$ and $p5$ comprises a capacitor $c5$. The capacitor $c5$ and a resistor $r8$ determine the flyback or return time of the flip-flop $K1$. The transistors $p2$ and $p5$ are connected in a manner whereby, in the absence of an outside control voltage, the transistor $p5$ is always in its conductive condition and the transistor $p2$ is always in its nonconductive condition. When an appropriate control signal is supplied to the flip-flop $K1$, its state or condition is reversed for the duration of the flyback or return time. The control capacitor $c1$ may thus discharge via the variable resistor $r4$, a diode $n6$ of the flip-flop $K1$ and the emitter-collector path of the transistor $p2$.

The threshold unit W provides the control signal for the flip-flop $K1$. The threshold unit W comprises a current transformer, of which only the secondary winding $w$ is shown in FIG. 2. The current of the control member S (FIG. 1) flows through the primary winding (not shown) of the current transformer of the threshold unit W. The secondary winding $w$ is connected in parallel with a resistor $r12$ and is connected between the AC or input terminals of a rectifier bridge B. The rectifier bridge B comprises four diodes, and its positive polarity terminal is connected to the terminal M of the first DC voltage source. The negative polarity terminal of the rectifier bridge B is connected to the positive terminal P of the second DC voltage source via the resistor $r6$ and the resistor $r7$. The resistor $r7$ is connected in series circuit arrangement with a Zener diode $n8$ between the terminals P and M of the second DC voltage source. The input signal for the flip-flop $K1$ is derived from the tap point at the resistor $r6$ and is supplied via a diode $n7$.

The base-emitter path of the transistor $p3$ is connected in parallel with the control capacitor $c2$ and is connected to a part of a voltage divider which is connected between the terminals M and N of the first DC voltage source. As a result, the transistor $p3$ is biased in inverse or reverse direction. The base electrode of the transistor $p3$ is connected via a capacitor $c3$ and a resistor $r9$ to the positive terminal P of the second DC voltage source.

A current which controls the conductivity condition of the transistor $p3$ may temporarily flow via the current branch until the capacitor $c3$ is completely charged, if both diodes $n4$ and $n5$ are in their nonconductive condition. The cathode of the diode $n5$ is directly connected to the collector electrode of the transistor $p5$ of the flip-flop $K1$. The diode $n5$ and the transistor $p5$ are thus in their nonconductive condition only during the flyback or return time of the flip-flop K.

The cathode of the diode $n4$ is connected to the collector electrode of the transistor $p4$. The transistor $p4$ is connected in a timing circuit. The emitter-collector path of the transistor $p4$ is connected in series with a resistor between the the terminals of one of the DC voltage sources. The base electrode of the transistor $p4$ is connected to the terminal P of the second DC voltage source via resistors $r10$ and $r11$. The diode $n4$ and the transistor $p4$ are thus normally in their conductive condition.

A common point in the connection of the resistors $r10$ and $r11$ is connected to the collector electrode of the transistor $p5$ of the flip-flop $K1$ via a capacitor $c4$. When the transistor $p5$ is in its conductive condition, during the flyback or return time of the flip-flop $K1$, the control current of the transistor $p4$ may flow via the capacitor $c4$ until said capacitor is completely charged via the transistor $p5$. The transistor $p4$ is thus in its nonconductive condition during this period. However, the transistor $p5$ is in its conductive condition when the flip-flop $K1$ is in its stable state, so that the capacitor $c4$ is charged when the flip-flop $K1$ is reversed in condition via a first overcurrent.

Thus, during the first overcurrent signal, the transistor $p4$ and the diode $n4$ remain in their nonconductive condition. Therefore, during the flyback or return time of the flip-flop $K1$, the capacitor $c4$ discharges. The charging of the capacitor $c4$ commences at the termination of the flyback time of the flip-flop $K1$, as soon as the transistor $p5$ returns to its conductive condition.

The transistor $p4$ and the diode $n4$ are in their conductive condition during a period of time determined by the time constant of the capacitor $c4$ and the resistor $r10$. The indicated time constant, and also the period of nonconductivity, are such that the transistor $p4$ remains in its nonconductive condition slightly longer than the interval between two overcurrent signals which occur during two successive half waves or half periods of the AC energizing voltage. Thus, when overcurrents occur in two successive half waves of the AC energizing voltage, which overcurrents exceed the response level adjusted in the threshold unit W (FIG. 1), the conditions are temporarily met. That is, the diodes $n4$ and $n5$, which together with the resistor $r9$ function as an AND gate, are in their nonconductive condition, so that the transistor $p3$ may become conductive for a brief period. The adjusted response level in the threshold unit W corresponds to the indices for the ignited arcs.

When the transistor $p3$ is in its conductive condition, the control capacitor $c2$ is very rapidly and considerably discharged through said transistor to the point at which the capacitor voltage is essentially zero. The input voltage UAM applied to the input terminals A and M of the control unit J is thus accordingly reduced. Consequently, the voltage of the filter F is reduced to the same extent via the control member S. Thus, an arc which may be in existence is extinguished.

After the extinguishing of the arc, the filter voltage is to be restored to a high magnitude, as rapidly as possible. The time constant of the control capacitor $c2$ and the charging resistor $r3$ is thus selected so that it is appropriately small. Thus, after the transistor $p3$ is switched to its nonconductive condition, the control capacitor $c2$ is recharged very rapidly to almost the magnitude of the voltage of the control capacitor $c1$. The control capacitor $c1$, however, is discharged at a variable level, during the flyback or return time of the flip-flop $K1$, that is after each overcurrent signal. The control capacitor $c1$ is discharged via the variable resistor $r4$, the diode $n6$ and the transistor $p2$ of the flip-flop $K1$. The discharge of the control capacitor $c1$ is considerably less than the discharge of the control capacitor $c2$. Furthermore, the control capacitor $c1$ has a considerably greater capacitance than that of the control capacitor $c2$, so that, without variation of the charging current flowing through the transistor $p1$, the charging period of the control capacitor $c1$ is considerably longer than that of the control capacitor $c2$.

The operation of the circuit arrangement of FIG. 2 is illustrated by the curves $a, b, c, d, e, f$, and $g$ of FIG. 3. Each of the curves $a$ to $g$ of FIG. 3 has an abscissa representing time $t$ and an ordinate representing voltage or potential relative to the terminal M of the DC voltage source. The curve $a$ of FIG. 3 represents the input voltage to the flip-flop K1 at the point $a$ in the circuit arrangement of FIG. 2. The maximum magnitude of the potential $a$ is determined by the voltage $U4$ across the Zener diode $n8$. Such voltage decreases when the voltage $U3$ increases. The voltage $U3$ is proportional to the individual half waves of current. The voltage $a$ becomes equal to or smaller than the potential at the terminal M of the DC voltage source at a specific magnitude of the voltage $U3$. The specific magnitude of the voltage $U3$ which controls the voltage $a$ is varied by variation of the variable resistor $r6$.

When the potential $a$ becomes equal in magnitude to the potential at the terminal M of the DC voltage source, a considerable portion of the control current of the transistor $p5$ of the flip-flop K1 flows toward said terminal via the resistor $r8$. This triggers the flip-flop K1. During the flyback or return time of the flip-flop K1, which flyback time is determined by the capacitor $c5$ and the resistor $r8$, a positive signal is thus provided at the point $b$ of the collector electrode of the transistor $p5$, and is shown in curve $b$ of FIG. 3. The flyback or return time is, for example, 7 milliseconds. The transistor $p2$ is in its conductive condition during the flyback time and its collector potential, as shown in curve $c$ of FIG. 3, is zero at that time. This slightly decreases the potential at the control capacitor $c1$, as shown in curve $g$ of FIG. 3.

Upon the termination of the flyback or return time of the flip-flop K1, the capacitor $c4$ is charged and the transistor $p6$ of the counter L, flip-flop K2 is switched to its nonconductive condition. The collector potential of the transistor $p6$, as shown in curve $d$ of FIG. 3, is positive, beginning at such instant, for a period of approximately 10 milliseconds. This period is determined by the aforedescribed time constant. If there is then an overcurrent during the period of nonconductivity of that the transistor $p6$, that is, even during the next half wave of current, and if the flip-flop K1 responds, as assumed in FIG. 3, the diodes $n4$ and $n5$ will be in their nonconductive condition for brief periods. This causes the transistor $p3$ to be switched to its conductive condition by a positive signal, shown in curve $e$ of FIG. 3, which is present during the overlapping period.

Since the transistor $p3$ is in its conductive condition, the control voltage, as shown in curve $f$ of FIG. 3, decreases very rapidly to a magnitude very close to zero and then increases again toward a magnitude determined by the control capacitor $c1$. The voltage of the filter F (FIG. 1) varies accordingly.

While the invention has been described by means of a specific example and in a specific embodiment, I do not wish to be limited thereto, for obvious modifications will occur to those skilled in the art without departing from the spirit and scope of the invention.

I claim:

1. A circuit arrangement for automatically controlling the voltage of an electrical filter which is coupled to an AC voltage source via a control member, a transformer and a rectifier connected in series between said AC voltage source and said filter, said circuit arrangement comprising control means connected to said control member for controlling the operation of said control member, said control means comprising a control unit having an input connected to said AC voltage source, another input and an output connected to said control member for supplying to said control member a control magnitude corresponding to a control voltage applied to the other input of said control unit, a DC voltage source, a charging resistor, a control capacitor connected to said DC voltage source via said charging resistor and connected to the other input of said control unit for applying a control voltage to said control unit, discharge circuit means and circuit means and circuit means connecting said control capacitor to said discharge circuit means in parallel in accordance with the instantaneous magnitude of current flowing through said control member, said control capacitor discharging very considerably, said circuit means comprising switching means coupled to said control capacitor and coupling means including a counter connecting said switching means to said control member, said coupling means controlling the conductivity condition of said switching means in a manner whereby said control capacitor is discharged only when the instantaneous magnitude of current flowing through said control member exceeds a response level within a specific interval between successive half waves of said AC source.

2. A circuit arrangement as claimed in claim 1, wherein the counter of said coupling means comprises an AND gate having inputs and an output, a first transistor having emitter, collector and base electrodes, said first transistor being biased in inverse direction, a first capacitor connected between the output of said AND gate and the base electrode of said first transistor, and wherein said circuit arrangement further comprises monostable flip-flop means having a second transistor having emitter, collector and base electrodes, an input of said AND gate being connected to the collector electrode of said second transistor, said second transistor having a conductivity condition which reverses said flip-flop means each time the instantaneous magnitude of current flowing through said control member exceeds the response level, a second input of said AND gate being connected to the collector electrode of said first transistor, a pair of resistors connected in series circuit arrangement with each other, said first transistor being connected in grounded emitter connection via said pair of resistors, a second capacitor connected between a common point in the connection of said pair of resistors and the collector electrode of said second transistor, a charging circuit for said second capacitor having a time constant which is such that the period of nonconductivity of said first transistor is slightly longer than said specific interval.

3. A circuit arrangement as claimed in claim 2, wherein said monostable flip-flop means has another transistor having emitter, collector and base electrodes and an emitter-collector path, and wherein said circuit arrangement further comprises another control capacitor connected in parallel with the emitter-collector path of said other transistor, a resistor and a diode connected in parallel with said other control capacitor, said other control capacitor being connected in parallel with said control capacitor via said resistor and said diode, said resistor and said diode blocking the charging current of said other control capacitor.